United States Patent [19]

Donahue et al.

[11] 3,804,060

[45] Apr. 16, 1974

[54] LIQUID EPITAXY APPARATUS

[75] Inventors: John A. Donahue, Sudbury; Henry T. Minden, West Concord, both of Mass.

[73] Assignee: Sperry Rand Corporation, New York, N.Y.

[22] Filed: June 28, 1972

[21] Appl. No.: 266,867

Related U.S. Application Data

[63] Continuation-in-part of Ser. No. 23,148, March 27, 1970, Pat. No. 3,697,330.

[52] U.S. Cl. .................................... 118/64, 118/426

[51] Int. Cl. .............................................. H01l 7/00

[58] Field of Search ............................ 118/48–49.5, 118/415, 421, 416, 64, 423, 425, 426; 117/114 R, 114 A, 114 B, 114 C, 113; 148/271, 272

[56] References Cited

UNITED STATES PATENTS

| | | | |
|---|---|---|---|
| 330,318 | 11/1885 | Green et al. | 118/426 |
| 744,750 | 11/1903 | Green | 118/426 UX |
| 2,025,467 | 12/1935 | Lovell et al. | 118/425 X |
| 3,435,835 | 4/1969 | Hobbs | 118/426 UX |
| 3,535,772 | 10/1970 | Knight et al. | 148/171 X |
| 3,551,219 | 12/1970 | Panish et al. | 118/425 X |
| 3,664,294 | 5/1972 | Solomon | 118/415 X |
| 3,694,275 | 9/1972 | Nelson | 148/172 X |
| 3,705,825 | 12/1972 | Touchy et al. | 148/171 X |
| 3,043,722 | 7/1962 | Houben et al. | 117/201 X |
| 3,632,431 | 1/1972 | Andre et al. | 148/171 UX |

*Primary Examiner*—Morris Kaplan
*Attorney, Agent, or Firm*—Howard P. Terry

[57] ABSTRACT

An apparatus and method for practicing liquid-phase epitaxial purification of semiconductor materials and for the preparation of semiconductor films or junction semiconductor devices employs a novel closed cylindrical graphite crucible element. The molten material to be deposited on a substrate is brought into contact with the substrate by simple rotation of the crucible about an axis of symmetry.

7 Claims, 8 Drawing Figures

LIQUID EPITAXY APPARATUS

CROSS REFERENCE TO RELATED APPLICATION

This is a continuation-in-part division of patent application Ser. No. 23,148, filed Mar. 27, 1970 and entitled: "Liquid Epitaxy Method and Apparatus", in the names of H. T. Minden and J. A. Donahue and assigned to Sperry Rand Corporation, now U.S. Pat. No. 3,697,330.

BACKGROUND OF THE INVENTION

1. Field of the Invention

The invention relates generally to means for employing epitaxy in the growth of films or layers of semiconductor and other materials of predetermined constituency upon compatible substrates. More particularly, the invention relates to means for the depositing of over-layers upon selected substrates of predetermined semiconductor or other materials by employment of liquid-phase epitaxy in a closed crucible.

2. Description of the Prior Art

Zone refining methods, crystal pulling methods, and vapor-phase epitaxial methods have been extensively employed in the prior art for semiconductor and other crystal growth and for materials purification, but have not proven fully successful for applications involving certain materials, including compound semiconductor materials such as, for instance, gallium arsenide. Often, compound semiconductor or other materials decompose if heated as required in systems such as employed in the prior art, and demonstrate other characteristics making the use of such prior art methods difficult or fully unsatisfactory. The floating-zone method has proven awkward and unreliable for treating gallium arsenide-like materials, for example. The crystal pulling method requires introduction of rotary and lifting motions into a sealed system and is difficult to practice with gallium arsenide for other reasons. Gallium arsenide vapor-phase epitaxy has utility where thin films are to be made, but thick layers produced by the method are non-uniform and equipment requirements are often complex. The several prior art methods, when used with gallium arsenide-like materials, represent methods requiring consumption of considerable time for operation and for apparatus maintenance and therefore are costly.

It has been shown that liquid-phase epitaxy has promise for use with gallium arsenide-like materials and that it has certain advantages over other prior methods, especially for the generation of highly doped epitaxial films or of high-quality p-n junction devices. For example, tunnel diodes and laser diodes of good quality have been made by dissolving gallium arsenide in a metallic solvent in a graphite boat or crucible and then tilting the furnace containing the boat so as to permit the melt to flow over a prepared surface of a substrate lying on the bottom of the crucible. During cooling, epitaxial growth on the substrate surface of gallium arsenide ensues and is stopped at the desired point by letting the furnace tilt back to its original position.

While the above-described method, even in its elementary form, has provided successful products made of decomposable semiconductor compounds, certain disadvantages are apparent. Since the furnace is to be tilted, its size is limited, and therefore production quantity is limited. With small furnaces, it is not possible to ensure that all critical parts of the crucible or boat are at substantially the proper temperature. Moreover, there is no way of determining if the melt has actually contacted the substrate surface and it is not possible to decant it. The method has not been adapted to producing thin films and improperly directed temperature gradients have caused non-uniform layer thicknesses and inhomogeneities in the deposit. To achieve films of a desired thickness, lapping and polishing must be resorted to, but such is not practical where films less than 0.001 inches in thickness are needed.

SUMMARY OF THE INVENTION

The present invention provides practical apparatus for practicing liquid-phase epitaxial purification of compound semiconductor and other materials such as garnets or ferrites and for fabrication of semiconductor films on substrates of the type required for certain semiconductor junction devices. In one form, a closable hollow cylindrical graphite crucible or boat, having an axis of symmetry, is employed. With the crucible horizontal and open, the substrate to be treated is held against the upper side of the interior wall of the crucible. Predetermined portions of the semiconductor or other compound and a metal solvent are placed on the lower side of the inner wall. When placed in a furnace and after heating, the resultant melt is thus at the bottom of the crucible, not in contact with the substrate. When the crucible has reached the proper temperature, it is rotated until the melt contacts the substrate surface. With gradual reduction in the temperature of the crucible, epitaxial deposition of a semiconductor or other layer continues on the substrate surface. The process is stopped by a second rotation of the crucible to decant the remaining melt, removing the substrate from its vicinity. One embodiment of the invention transfers the melt to and from the substrate by a full 360 degree rotation of the crucible. A further embodiment permits only a well-defined volume of the melt to contact the substrate surface and ensures a preferred temperature relation between the melt and the substrate. A further embodiment provides a means of large quantity manufacture.

DESCRIPTION OF THE PREFERRED EMBODIMENTS

Figures 1, 2:
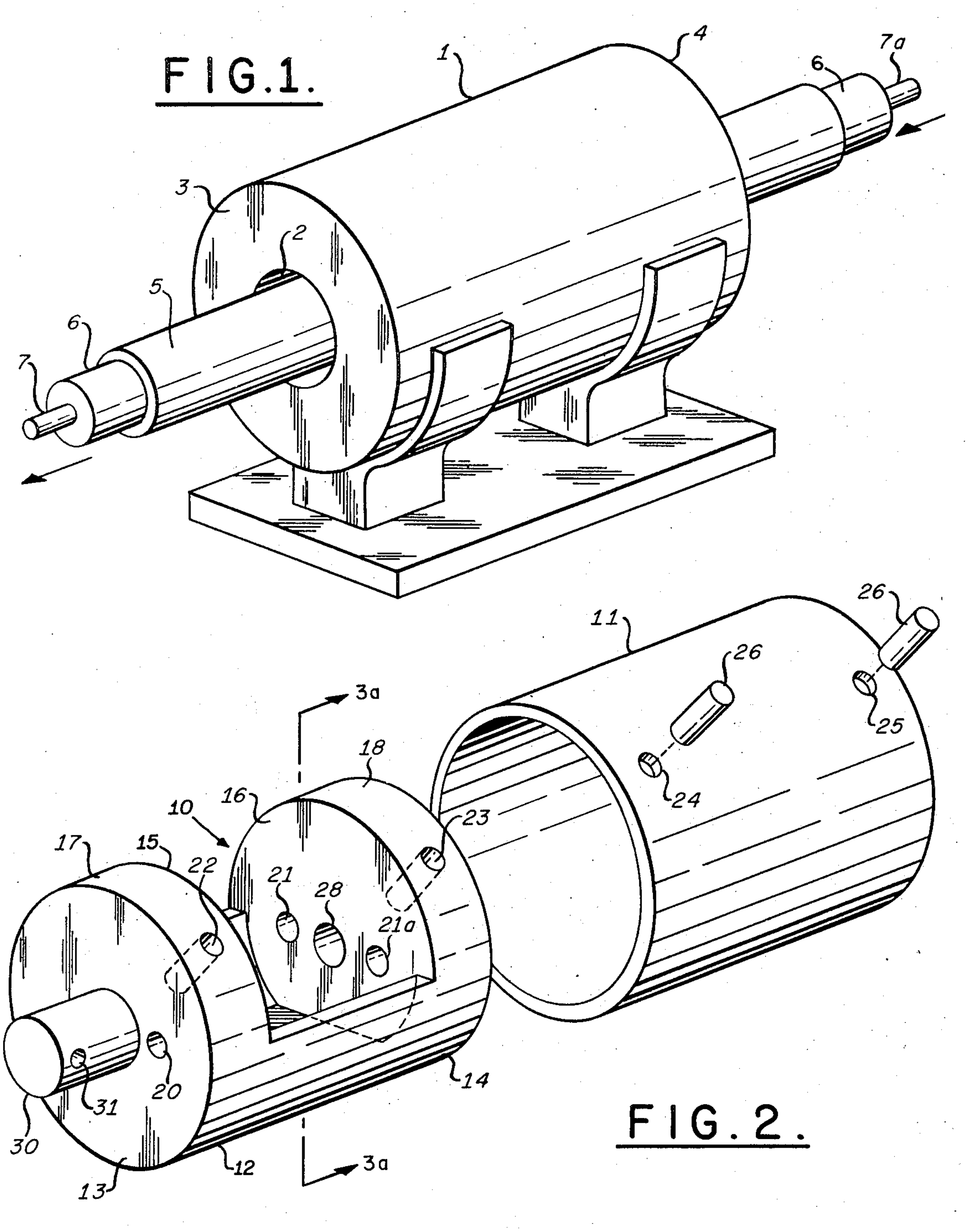
FIG. 1 is a perspective view of a conventional electric furnace in which the invention may be employed.
FIG. 2 is an exploded perspective view of one form of the invention.

The novel apparatus of the present invention is used in the environment of a conventional electric furnace 1 of the general type illustrated in FIG. 1. Such furnaces are readily available on the market and are often characterized by having a cylindrical casing containing suitable electrical and thermal insulation means dispersed adjacent suitable electrical heater elements. Such interior elements are arranged so that a passage way 2 extends along the axis of the furnace, being open at both end walls 3 and 4 of the furnace; passage way 2 is particularly designed to accommodate objects to be heated within the interior of furnace 1.

In semiconductor device manufacture, for example, one particular way of using such a furnace is to insert a quartz reactor tube 5 through the passage way 2, permitting the tube 5 to extend beyond both ends of the furnace. Commonly, crucibles or other reaction elements of various types are placed within tube 5 substantially at the mid-point of passage 2 for controlled or programmed heating and cooling and the ends of tube 5 are closed by closures 6 of an inert material such as a polymerized fluorocarbon resin. Closures 6 may be drilled out to accommodate the respective tubes 7 and 7*a*, permitting forced passage of neutral or other gases through reactor 5 during the heating or reaction interval.

Figure 3:
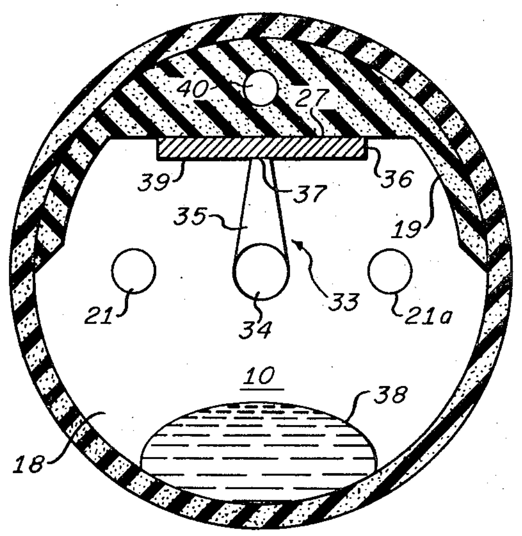
FIGS. 3 and 3*a* are views, partly in cross section, taken at the line 3—3 of FIG. 2 illustrating the location of the melt before and after the device of FIG. 2 is rotated through 180 degrees.
Figure 3A:
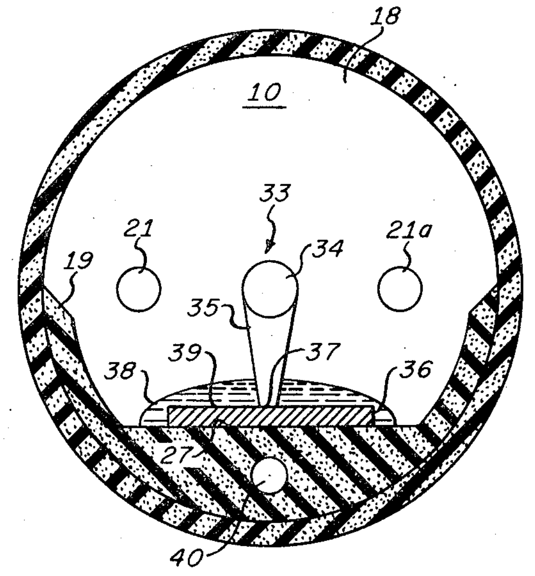

FIGS. 2, 3, and 3*a* illustrate a form of a novel crucible for practicing liquid-phase epitaxy within the furnace reactor tube 5 of FIG. 1. Referring particularly to FIG. 2, the crucible comprises cavity-defining means in the form of cylindrical block 10 and closure means in the form of a thin tubular shell 11 adapted to be slid over cavity block 10 for completing closure thereof. Elements 10 and 11 are constructed of pure high-density graphite, a material readily available on the market for use in vacuum tube and other applications. It is understood that the graphite material may be cut into shape or machined by substantially the same kinds of tools as are normally employed in shaping objects from rods or tubes of metal. The significant exception is that a high level of care and cleanliness is maintained, no cutting fluids or other such contaminating agencies being tolerated.

Cavity defining means or cavity block 10 may be made from a circular cylinder of graphite, having a cylindrical surface 12 and flat parallel end surfaces 13 and 14. The interior of cavity block 10 is formed between flat inner surfaces 15 and 16, also generally parallel to end surfaces 13 and 14. Surfaces 13, 15, and 14, 16 respectively define end walls 17 and 18. End walls 17 and 18 are integral with and joined together by a generally sector-shaped central portion 19 seen best in the cross section view of FIG. 3*a*.

As seen in FIG. 3*a*, the interior of central portion 19 is equipped with a substantially flat surface portion 27 for purposes yet to be described. The end walls 17 and 18 are equipped with respective holes for permitting gas flow into and out of the cavity block 10, such as holes 20 and 20*a* (hole 20*a* is not shown in FIG. 2) in end wall 17 and holes 21 and 21*a* in end wall 18.

The crucible cavity defining means is readily closed by sliding closure means or hollow shell or tube 11 over the circular surfaces of end walls 17 and 18. The closure tube or shell may conveniently be held in place by matching the positions of the respective holes 22 and 23 drilled radially in end walls 17 and 18 with corresponding radial holes 24 and 25 drilled through tube 11. With the respective holes aligned, graphite pins, such as pin 26, may be inserted in the holes to prevent relative motion between cavity block 10 and closure tube 11. The pins 26 perform their function by virtue of their friction fit within the respective holes.

It will be understood that other known mechanical closure arrangements may be used in place of the slidable tube or shell 11 for permitting access to and closure of the interior of cavity block 10. In such instances, tube or shell 11 may be made integral with cavity block 10 and other means of access may be provided. For example, an end wall such as end wall 18 of cavity block 10 may be supplied with an opening, fitting a closure cap or lid means, affixable to the cavity defining block 10 by threads or by other known fastening means. Such closure devices are well known to those skilled in the mechanical arts and need not be further described here.

For providing means for inserting and withdrawing the novel crucible from the reactor tube 5 of FIG. 1, and for rotating the crucible therein, an integral graphite cylindrical central extension 30 of wall 17 is provided. A simple handling rod (not shown) may be provided having a short portion at one end bent at right angles to its major portion. A hole 31 is drilled in extension 30 at right angles to the axis of extension 30. Hole 31 accommodates the short portion of the handling rod, permitting motion of the crucible by manual imposition of a similar motion upon the unbent major end of the handling rod.

In FIG. 2, it is seen that end wall 18 is provided with a substantially central hole 28, whose purpose will be understood by reference to FIGS. 3 and 3*a*. A graphite hold-down device 33 comprising a rod 34 integral with a wedged or plate shaped element 35 permits holding of an element to be treated, such as a plate 36 of substrate material, against the flat surface 27. The face 37 of hold-down device 33 is adapted to press firmly against substrate plate 36 when rod 34 is inserted in hole 28, holding substrate plate 36 against surface 27. Generally, surface 27 may have any desired contour matching the shape of a surface of substrate or plate 36.

FIGS. 1, 2, 3, and 3*a* are of use in explaining operation of the invention. With closure sleeve 11 removed from the cavity defining block 10 and with cavity block 10 in the position shown in FIG. 3, a pre-treated substrate plate 36 is placed against flat surface 27 and hold-down device 33 inserted in hole 28 in such a position that substrate plate 36 is held in position. Still maintaining the same position of cavity-block 10, a mechanical mixture of materials is placed on a surface remote from and below plate 36 where the globule 38 is to be formed by melting. The mechanical mixture may, for example, comprise chunks or particles of miscellaneous sizes of a compound semiconductor material and of a metal in which such a compound material can be placed in solution by melting. Also, suitable dopant materials may be added in solid form. The closure sleeve 11 is placed over the cavity defining block 10, and pins such as pin 26 are respectively inserted through holes 24 and 25 into holes 22 and 23. The assembled crucible is pushed, using the handling rod afore-described, through an open end of reactor tube 5 into the middle region of furnace 1. This is done while maintaining the crucible system essentially in the position of FIG. 3.

The furnace 1 is then heated to a temperature such that the compound semiconductor or other material melts and dissolves fully in the solute metal. When the solute and solvent are at the proper temperature, the molten material forms the globule 38 of FIG. 3, where it is seen still to be resting adjacent a surface remotely located from substrate plate 36. Such temperature may be measured by a thermocouple placed in a hole 40 in the graphite material of the central portion 19.

The crucible is now rotated by 180 angular degrees, bringing it to the position illustrated in FIG. *3a*. It is seen that the globule 38 now at least fully covers surface 39 of substrate 36, the quantity of the materials comprising the melt having been correctly chosen in view of the shape of globule 38 as dictated by parameters such as surface tension and the like. Now, as the temperature of furnace 1 is slowly lowered, the growth of a single crystal layer of the compound semiconductor materials progresses on the substrate surface 39. Growth of the epitaxial layer of compound semiconductor or other material is permitted to continue to a desired thickness, whereupon the process is stopped by again rotating the crucible through 180 angular degrees so that it is again in the position represented in FIG. 3. Excess melt has been decanted from the surface 39 of substrate 36 and falls back to the original surface position of globule 38 in FIG. 3. Globule 38 may now consist primarily of the solvent metal which may be discarded. After removing the crucible from furnace 1, hold-down device 33 is removed, freeing substrate 36 for removal from the crucible interior. Any excess solvent metal on the epitaxial layer may be mechanically removed by subsequent lapping, or by being dissolved, for example, in hot concentrated hydrochloric acid. The novel crucible is now ready for re-use.

Figure 4:
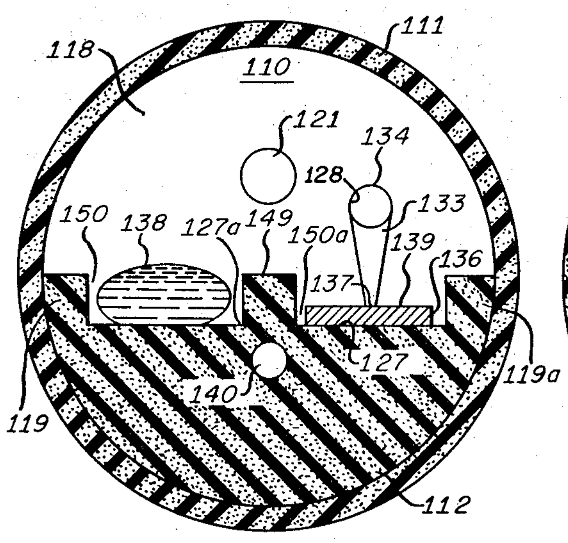
FIG. 4 is a view, partly in cross section and similar to FIG. 3, of a second form of the invention.

FIG. 4 represents an alternative form whose construction may also be explained with reference to FIG. 2. Elements of FIG. 4 similar to those of FIGS. 3 and *3a* have the same reference numbers with one hundred added to them. For example, it is observed that the crucible device of FIG. 4 is encompassed by a closure shell or tube 111 of graphite corresponding to the graphite tube 11 of FIGS. 2, 3, and *3a*. The internal structure of the cavity defining block means 110 departs from that of cavity block 10 of FIGS. 2, 3, and *3a* in such a manner as to require rotation of the crucible through 360 angular degrees for transfer of the melt globule 138 relative to substrate 136.

Referring particularly to FIG. 4, the central or connecting portion 119 of the cavity-block 110 is supplied with two side-by-side chambers 150 and 150*a*, generally located on a diameter of the system, and lying between end wall 118 and its counterpart end wall 117 (not seen). Chamber 150 is also defined partly by central portion 119 and inner wall 149. Wall 149 also aids in defining chamber 150*a*, further bounded by central portion 119*a*. The base surfaces 127, 127*a* of the respective chambers 150 and 150*a* may be flat and lie in substantially the same plane. End walls 117 and 118 are respectively provided with holes 120 (not seen in FIG. 4) and 121 to permit flow of gas through cavity-block 110. End wall 118 is equipped with a hole 128 analogous to hole 28 of FIG. 2, but off-set, for the accommodation of the rod 134 integral with hold-down device 133.

As seen in FIG. 4, cavity defining means or block 110 is in the position in which it is first inserted into furnace 1 with material to be melted occupying the position of globule 138 on a first surface of the interior of the crucible. Also hold-down device 133 has been adjusted so that its face 137 bears against a surface 139 of substrate 136, holding it firmly against the flat surface 127 of chamber 150*a* remote from surface 127*a*.

As the temperature of the furnace 1 rises, the semiconductor mixture in chamber 150 melts, forming globule 138. When temperature conditions are correct as recorded by a thermocouple placed in hole 140, the crucible is rotated counter-clockwise about its cylindrical axis through 360 angular degrees, whereupon the crucible returns to the same position as indicated in FIG. 4, but globule 138 is now transferred to chamber 150*a* and covers at least the surface 139 of substrate 136. When the epitaxial layer formed on surface 139 is of sufficient thickness, the crucible system is again rotated clockwise through 360 angular degrees, returning excess melt to its original position within chamber 150. Otherwise, the program for using the apparatus of FIG. 4 is generally similar to that for using the device of FIGS. 2 and 3.

Figure 5:
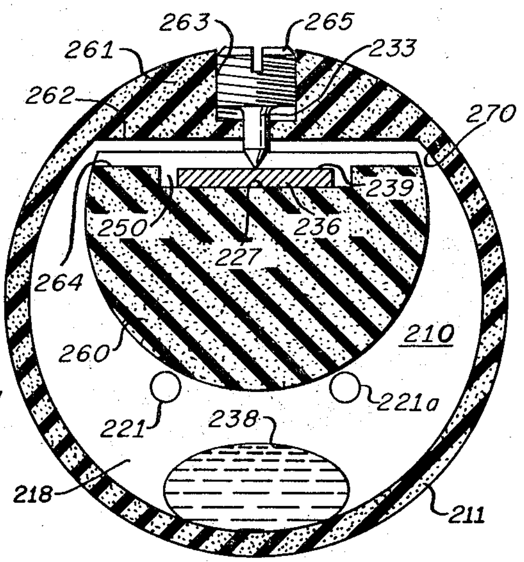
FIG. 5 is a view similar to FIG. 4 of a third embodiment of the invention.

FIG. 5 illustrates a preferred embodiment of the invention in which transfer of melt relative to the surface 239 of the substrate 236 is accomplished, as in the embodiment of FIGS. 3 and *3a*, by 180 angular degree rotation of the crucible. Elements similar to those of FIG. 2, 3, and *3a* have the same reference numerals, with a factor of 200 added. Again, the device comprises two primary cooperating parts, the first of which is a removable closure such as tubular shell 211 which may be located on the cavity defining block 210 by graphite pins, just as pin 26 of FIG. 2 is employed, which pins extend through shell 211 into end wall 218 and its companion end wall 217 (not seen in FIG. 5). Closure shell 211 is equipped with a wall portion 261 having a substantially flat side 262 on the inner cylindrical surface 270 of shell 211.

The cavity defining block 210 comprises end walls 217 and 218, each provided with holes such as holes 221, 221*a* on wall 218 for the flow of gas. End walls 217 and 218 are of graphite and are integrally joined to central graphite member 260 which is circularly cylindric in cross section, but which is provided with a flattened surface 264. Surface 264 has a chamber 250 with a substantially flat base surface 227 for accommodating a substrate such as plate 236. Wall portion 261 is provided with a threaded hole 263. Screw 265, having a hold-down element 233, cooperates with threaded hole 263. When a substrate plate 236 is placed in chamber 250 and screw 265 is tightened, the top of hold-down device 233 bears against the flat surface 239 of substrate 236, holding it firmly against chamber surface 227.

In use, closure shell 211 and chamber-block 210 are first separated sufficiently to provide access to the interior of the crucible, screw 265 having been withdrawn. Semiconductor materials are placed on a surface in the position remote from surface 227 shown in FIG. 5 as occupied by globule 238. Also, substrate plate 236 is placed in chamber 250 on surface 227. Keeping the parts in the general angular location shown in FIG. 5, closure shell 211 is slid over end wall 217, thus enclosing cavity block 210, and is pinned in place with graphite pins, such as pin 26 of FIG. 2. Screw 265 is then turned so that substrate plate 236 is held firmly in chamber 250. It is understood that shell 211 may be integral with cavity block 210, that element 260 may be supported from end wall 218, and that end wall 217 may be made removable so as to function as a closure means.

When the temperature of furnace 1 has caused the molten globule 238 to form, the closed crucible is rotated through 180 angular degrees. The gap or separation between flat wall 262 of the closure shell or tubular part 211 of the apparatus and the flat wall 264 of cavity block graphite element 260 is predetermined according to the surface tension of the molten material, so as to permit entry of the gap by the melt and its flow between the surface 239 of substrate 236 and surface 262, so that all of surface 239 is covered and wet by the melt.

When cooling has permitted the epitaxial layer sufficiently to form, the cylindrical crucible is rotated back through 180 angular degrees and excess molten material is decanted to the position shown for globule 238 when the crucible is oriented as in FIG. 5.

Figure 6:
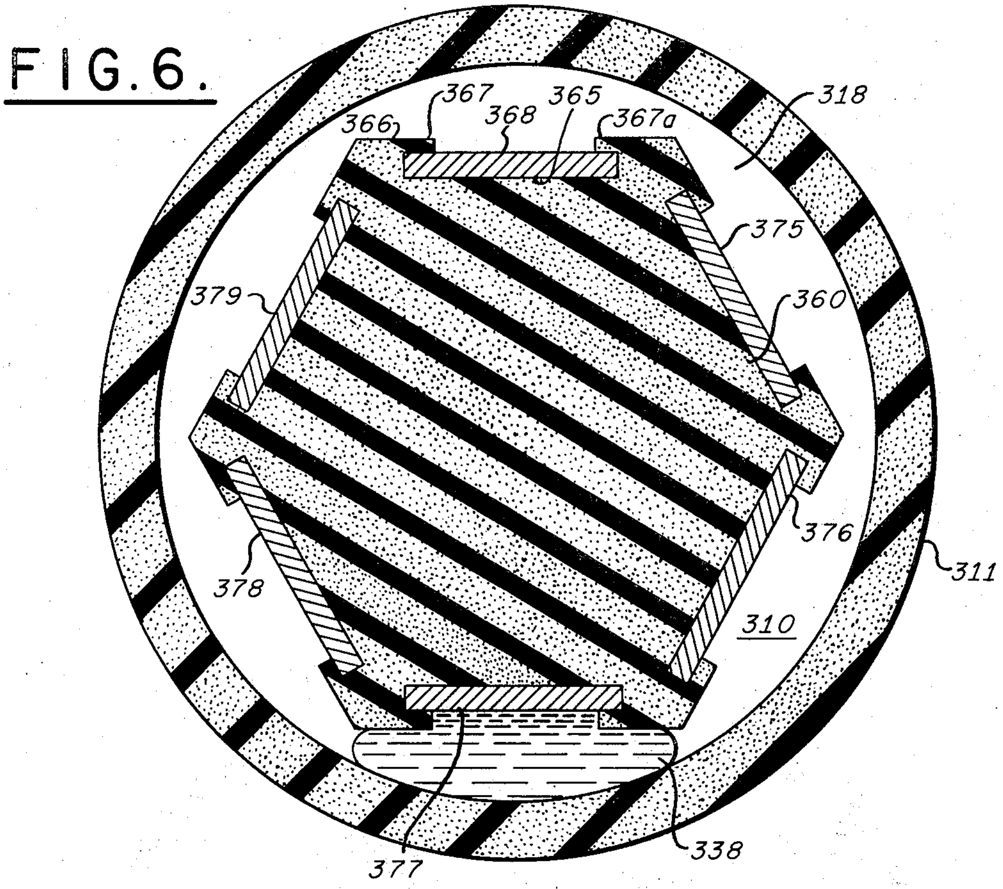
FIG. 6 is a view, partly in cross section of a further embodiment of the invention.
Figure 7:
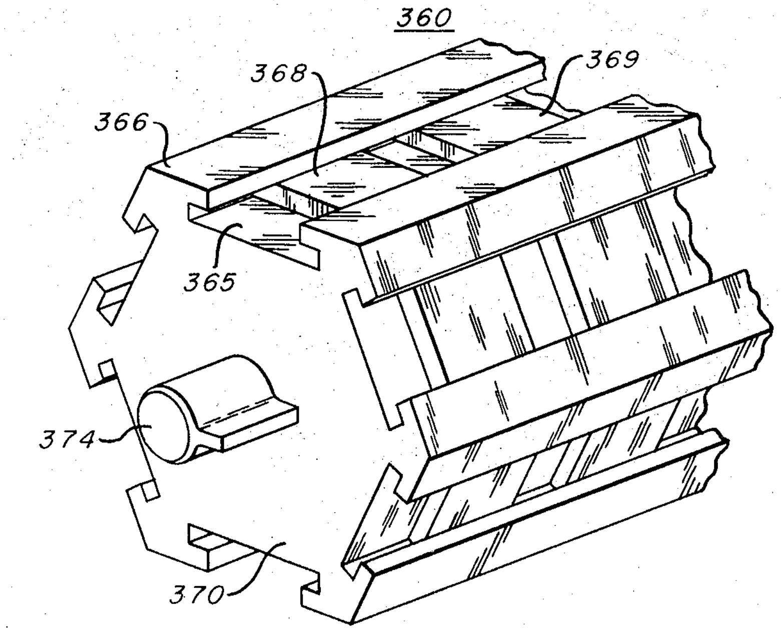
FIG. 7 is a perspective view of a portion of the apparatus of FIG. 6.

While the several forms of the invention so far described may readily be adapted to quantity production of epitaxially coated substrates, increased quantity of production may also be achieved using the crucible of FIGS. 6 and 7. As in FIG. 6, a further embodiment may consist of a hollow tubular shell closure 311 that may be removed from the interior parts of the crucible by sliding, as in the instance of shell 11 of FIG. 2. Closure 311 may also be pinned in place during use in the general manner described in connection with the FIG. 2 embodiment.

The tubular shell closure 311 may have parallel end walls which further aid in defining an interior cavity 310. As in FIG. 2, the cavity 310 may be defined in part by end wall 318 and by a second opposed end wall 317 (not seen) analogous to wall 17 of FIG. 2. Wall 317 may alternatively be a removable end cap, as previously described. Walls 317, 318 may be supplied with holes for the free passage of gasses analogous to holes 21, 21*a* in FIG. 2.

Supported between end walls 317, 318 within cavity 310 and on the axis of the crucible is a hexagonal cylinder 360 which may be integral with at least one of walls 317, 318. If end wall 317 is removable, it may be supplied with a central hole matching a keyed shaft 374 extending from the end face 370. It is understood that other multiple-sided cylinders may be employed, the hexagonal cylinder 360 being shown only by way of example. Further, it is seen that cylinder 360 is arranged to rotate with rotation of tubular closure 311.

Each side of cylinder 360 is provided with a milled-out slot disposed generally parallel to the face of the side, such as the slot having a face 365 in side 366, for example, face 365 being generally parallel to the surface of side 366. Each such slot is undercut, so as to provide overhanging substrate retainers 367, 367*a*. The slots are generally arranged so that substrate plates, such as plates 368 and 369, may readily be inserted into the slot having face 365, for example, from one end 370 of cylinder 360. The cylinder 360 may be made as long as convenient, each face being supplied with slotted surfaces for inlaying a large plurality of substrate plates for epitaxial treatment. Accordingly, large numbers of substrate elements may be simultaneously treated. FIG. 6 may be taken to represent the situation in which globule 338 has been formed by inserting the crucible into the furnace of FIG. 1, melting a mechanical mixture of solvent and solute metals. Upon cooling, solute metal is deposited on the surface of substrate 377 to the desired thickness.

Generally, the apparatus of FIGS. 6 and 7 may be employed in at least two ways. According to one method, substrate plates or wafers are located at 378, 379, 368, 375, and 376. A mixture of gallium and gallium arsenide, for instance, is placed in the position of globule 338 (or is inserted as a plate at 377). The crucible is assembled with the blank or metal mixture side down and is placed in the furnace in the same orientation. The furnace is purged of air and is brought to the appropriate temperature for melting and dissolving the metal solute and solvent metals. Now, the crucible assembly is rotated to contact the outer face of substrate 378 with the melt. The furnace temperature is lowered incrementally to foster deposition of the required epitaxial layer on substrate 378. The crucible assembly is again rotated, bringing the face of the second substrate plate 379 into contact with globule 338 while the furnace temperature is again incrementally lowered. The process of rotations and temperature reductions is continued until all substrate wafers have been epitaxially coated.

According to a second method of operation of the embodiment of FIGS. 6 and 7, and particularly where relatively thick epitaxial deposits are needed, sets of polycrystalline source or replenisher wafers are inserted in alternate slots of the cylinder. For example, if a particular solute material is to be epitaxially deposited, wafers of that material are placed at 379 and 375. Assume, for instance, that globule 338 has been formed by melting a wafer of solvent-solute metals, such as wafer 377. The crucible is next rotated to interface the substrate 378 with globule 338, the crucible temperature is lowered, and a layer of solute material is epitaxially grown on substrate 378, thus partly depleting globule 338 of solute metal. The crucible is again rotated, bringing a replenisher wafer 379 of solute metal in contact with the globule 338 and the crucible temperature is raised. Wafer 379 goes into solution in globule 338, replenishing solute metal in the latter. The crucible is again rotated, contacting the face of substrate plate 368 with globule 338. With the furnace temperature again lowered, an epitaxial deposition is made on the face of substrate 368. Wafer 375 may then be used to replace solute material in globule 338 which, after further rotation and temperature cycling of the furnace, is plated out upon the surface of substrate plate 376. In either method, the furnace is finally allowed to cool to near room temperature and the hexagonal cylinder is removed from the crucible by separation of its external parts. As seen in FIG. 7, the epitaxially coated wafers or plates may then be mechanically removed for further treatment.

It will be clear to those skilled in the art that the forms of the invention disclosed in FIGS. 1 to 5 may also readily be adapted to large quantity manufacture by making the crucibles long following the general concepts discussed in connection with FIGS. 6 and 7. For example, the embodiments of FIGS. 3*a*, 4 and 5 may be made long in the axial direction so that many substrates may be treated simultaneously. In the embodiment of FIG. 5, it will be evident to those skilled in the art that the crucible may be made to accommodate a series of substrate plates 239 one behind the other, held in place against the axially extended face 227, each substrate plate being held in place by a suitable hold-down device 233.

The several forms of the invention discussed above produce substantially the same desirable results in the absence of temperature gradients, a situation that can be substantially assured by allowing heating for a corresponding period of time. They provide relatively smooth deposits free of the voids and gallium or other solvent inclusions when decanting is done at relatively high temperatures by prior art methods. The configuration of FIG. 5 is particularly advantageous because it is arranged so that thermal gradients, when present, operate in a beneficial sense; i.e., the substrate is always cooler than the melt, the substrate being closer to the axis of the cylindrical crucible than the melt. Such an arrangement tends to avoid supercooling of the material on the substrate and it is therefore more readily possible to control the uniformity of thickness of the epitaxially deposited layer and to avoid voids and inclusions of the solvent metal. Further, a well-defined volume of melt is placed in contact with the surface layer. Therefore, reliable repeatability is enhanced.

While each of the several forms of the invention may be employed for fabrication of thin films purifying compound semiconductor materials or for forming semiconductor junctions, they may also be employed for more generally the same purposes using many different types of materials, elemental or compound which may be successfully grown by epitaxy from solution in a molten solvent.

By way of example, use of the invention to produce a particular gallium arsenide layer by epitaxial deposition on a substrate of the same material will be discussed particularly with reference to the FIG. 5 form of the invention. The parts of the inventive crucible are first fired in a radio frequency furnace in the conventional manner for outgassing graphite elements in vacuum and then in a hydrogen atmosphere to drive out traces of undesired volatile matter remaining in the graphite. The correct amount of gallium arsenide and solid gallium metal is placed in the cavity shell 211 at the location 238. The semiconductor gallium arsenide plate or slice 236 is usually etch-polished in a dilute-bromine methanol solution as in established practice. The [111] B plane is chosen for the deposition surface. The slice is placed in chamber 250 and then hold-down device 233 is caused to engage its surface 239, shell 211 having been slid fully in place over end walls 217 and 218. To enhance wetting of the substrate surface 239, 5 atomic percent of indium may have been added to the solid gallium materials.

After loading, the crucible is placed in the furnace 1 as previously described. The reactor tube 5 (FIG. 1) is purged of air by a flow of nitrogen injected through tube 7*a* and passing through reactor tube 5, through the crucible, and out through tube 7. A flow of pure hydrogen then replaces the nitrogen.

When purging is deemed complete, furnace 1 is heated, bringing the reactor tube 5 and its enclosed crucible up to the desired temperature, melting the gallium materials and forming globule 238. The peak temperature of the interior of furnace 1 is caused to reach substantially 850° C, whereupon a relatively slow cooling program is started. A cooling rate found satisfactory in on the order of 0.2° C per minute though other low rates may be successfully employed. After a short cooling period, depending in magnitude upon the desired deposit thickness, which may be on the order of 300 microns, the crucible is rotated to decant the remaining melt from the substrate. The substrate is immediately quenched by pulling the crucible out of the furnace into the unheated zone of reactor tube 5. Upon sufficient cooling, excess gallium may be removed as previously suggested, and the product may then be subjected to other manufacturing steps conventionally employed in the fabrication of semiconductor devices of the gallium arsenide type.

The inventive crucible permits the molten material to contact the substrate surface in a positive manner through rotation of the crucible about an axis coincident with the axis of the reactor tube of the furnace. Positive decantation of the melt is achieved in the same precise manner, permitting the growth of thin epitaxial layers. The melt cannot stick to a portion of the crucible, for example, in the instance of certain compound semiconductor materials, such as aluminum-gallium-arsenide alloys. In such alloys, due to the presence of materials like aluminum which have a high affinity for oxygen, a slight oxide skin may form on the melt surface which inhibits free motion of the melt at shallow tilt angles. The rotational feature of the present invention ensures that the melt is brought positively into contact with the substrate, even in the presence of some oxidation.

The invention may be applied successfully to epitaxial growth using a variety of materials. Examples include germanium dissolved in tin, lead, gold, or indium and silicon dissolved in tin or gold. Group III–V compounds such as indium antimonide, indium phosphide, indium arsenide, gallium antimonide, gallium arsenide, gallium phosphide, and aluminum antimonide or mixtures thereof may be grown epitaxially from various metal solvents, as well as from other systems in which a metal with a relatively low vapor pressure can be used as a solvent for an intermetallic or other compound.

While the invention has been described in its preferred embodiments, it is to be understood that the words which have been used are words of description rather than limitation and that changes within the purview of the appended claims may be made without departure from the true scope and spirit of the invention in its broader aspects.

I claim:

1. Hollow crucible means adapted for liquid-phase epitaxial deposition of normally solid material on a substrate, said crucible comprising:

a horizontally arranged, elongated graphite member having a vertically extending end wall at each extremity thereof, a recessed portion disposed in said elongated member adapted to receive a substrate therein, a graphite tubular element slidably received about said end walls to form therewith a sealed said hollow means, means for fixing said tubular element with respect to said end walls, said tubular element being adapted to receive said normally solid material therewithin on a surface portion removed 180° from said substrate, holder means to secure said substrate in the recessed portion, means to heat said tubular means whereby to melt said solid material, means for rotating said hollow means about the longitudinal axis thereof, whereby an 180° of rotation said substrate is carried into contact with the molten material to effect said liquid-phase epitaxial deposition.

2. Apparatus as described in claim 1, wherein said holder means for holding said substrate extends from at least one said end wall.

3. Apparatus as described in claim 1, wherein said holder means for holding said substrate is dependent from said tubular means.

4. Apparatus as described in claim 1 wherein said hollow crucible means is adapted to permit flow of a gas therethrough.

5. Apparatus as described in claim 1 wherein said holder means for holding said substrate is adjustable.

6. Apparatus as described in claim 1, wherein the outer surface of said elongated member conforms closely to the inner surface of the tubular element encompassing such outer surface and said recessed portion of the elongated member is opposed to the tubular surface adapted to receive said solid material.

7. Apparatus as described in claim 1, wherein the surface of the elongated member including the substrate supporting recess is spaced from a facing and substantially parallel surface of the tubular element, said parallel surface being diametrically opposed to said solid material receiving portion and said spacing providing a small gap whereby on said 180° of rotation of said hollow means only a predetermined amount of the molten material passes through said gap to effect melting of the substrate.

* * * * *